Figure 1:
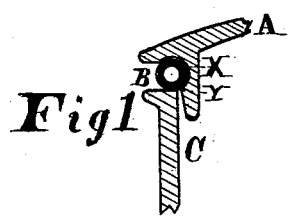
Figure 2:
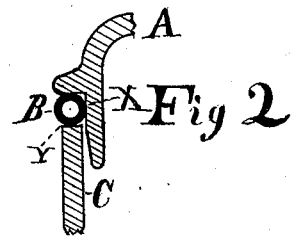
Figure 3:
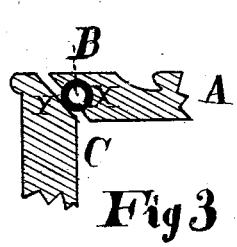
Figure 4:
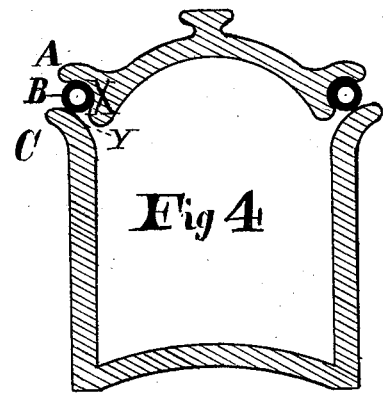
Figure 5:
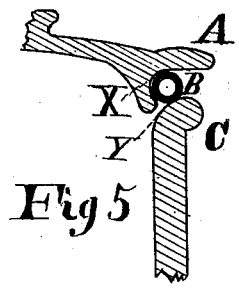
Figure 6:
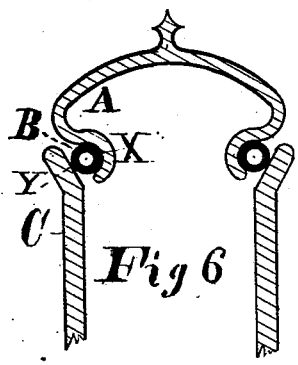

G. B. THOMPSON.
Covered Vessel.

No. 228,696. Patented June 8, 1880.

Witnesses:
C. R. Patterson
S. A. Patterson

Inventor
George B. Thompson

UNITED STATES PATENT OFFICE.

GEORGE B. THOMPSON, OF PITTSTON, PENNSYLVANIA.

COVERED VESSEL.

SPECIFICATION forming part of Letters Patent No. 228,696, dated June 8, 1880.

Application filed December 22, 1879.

*To all whom it may concern:*

Be it known that I, GEORGE B. THOMPSON, of the borough of Pittston, in the county of Luzerne and State of Pennsylvania, have invented a new and useful Improvement in Covered Vessels, of which the following is a specification.

This invention relates to hollow ware, such as crocks, water-coolers, chambers, confectioners' and druggists' jars, tureens, and like articles having loose covers, made of heavy materials, such as earthenware, porcelain, and glass, and to means for making the same sufficiently air-tight to exclude the atmosphere, or to confine heat, odors, &c., as the case may require.

The primary object of my invention is to make vessels of this character air-tight, or nearly so, without interfering with the ready removal and replacement of the cover and without any pressure besides the weight of the cover, and so as to offer no obstruction to the pouring of liquids from such vessels, and to provide for readily separating all the parts to facilitate cleaning, the same means being also adapted to render the cover noiseless and to lessen liability to breakage.

My invention consists, first, in a very sensitive annular gasket, of soft elastic tubing, having hermetically sealed therein more or less air or other elastic fluid, in combination with a vessel and a loose cover therefor, one of which is constructed with a circumferential seat for the said gasket, which is sprung into place on said part and held there by its own elasticity, while the other part is constructed with an opposing circumferential shoulder or bearing-surface, which forms a tight joint with the gasket under the weight of the cover. I accomplish by these means all the aforesaid objects at one and the same time, the elasticity of the gasket serving with that of the fluid therein to form the requisite sensitive packing, and also to attach the gasket to one of the parts so as to facilitate cleaning, &c., while this mode of attaching the gasket tends to insure a tight joint between it and the said part, and the slight stretching of the gasket incident thereto renders more sensitive that side of the gasket which packs against the opposing shoulder or bearing-surface by the weight of the cover.

My invention consists, secondly, in a cover having a circumferential gasket-seat in its edge, in combination with an annular gasket of soft elastic tubing sprung into said seat, and a vessel having a flaring upper edge, forming a bearing-surface, upon which said gasket makes an air-tight joint under the weight of the cover. By this combination I accomplish the aforesaid primary object, and also cause the gasket to be carried by and removed from the vessel with the cover, while the vessel is adapted to have a flaring open mouth, which greatly facilitates the manufacture of such vessels and their use for many purposes.

In the accompanying drawings, Figures 1, 2, 3, 4, 5, 6, 7, and 8 represent vertical sections of covered vessels illustrating my invention, Figs. 3 to 6 representing the preferred species.

Figure 7:
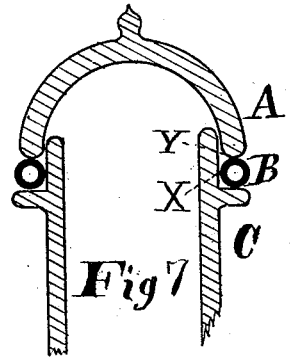
Figure 8:
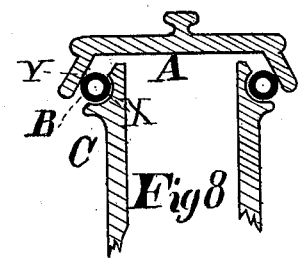

In each figure, A represents the cover, B the gasket, C the vessel, and X the gasket-seat. The latter may be upon the cover, as shown in Figs. 1, 2, 3, 4, 5, and 6, or upon the vessel, as shown in Figs. 7 and 8, and it may be of either of various shapes, as represented; but in each form it must be circumferential and adapted to receive and hold an annular gasket sprung into place. The other part of the covered vessel is constructed with a circumferential bearing-surface, Y, against which the gasket will pack, so as to form an air-tight, or nearly air-tight, joint under the weight of the cover, which must be of sufficient gravity to slightly compress the given gasket. This bearing-surface may also be of either of several forms, as shown; but it is adapted to be, and by preference is, in every case plain or convex and of sufficient extent to prevent its destruction by chipping.

The vessel and cover may, in each of the forms represented, be made either of earthenware, porcelain, or glass by ordinary methods, and of these materials covers of ordinary thickness are sufficiently heavy. Heavy covers of other materials may obviously be packed in the same manner.

The gasket B is made by first cutting from unvulcanized-rubber tubing, or tubing made from other vulcanizable elastic gum, a piece shorter than the seat X for which the gasket is intended; second, making the same contain more or less air or other elastic fluid by expanding or filling it therewith, or, in the case of air, by simply avoiding the expulsion of contained atmosphere if the tube is not collapsed; third, hermetically sealing together the ends of the tubing by cement, so as to form a smooth joint; and, fourth, vulcanizing or curing the article by the usual method, so as to render it permanently soft and elastic. The gasket may be made from vulcanized-rubber tubing; but a better joint is made in the tubing at the point where its ends are seated together by the above process. In either case a very sensitive gasket is readily formed, which will in all cases adapt itself to irregularities of surface and shape on articles of earthenware, porcelain, glass, and the like, under a light pressure, so as to insure forming tight joints in the combination above described.

The gasket should be sufficiently soft or flexible in proportion to the weight of the cover to insure a slight compression thereof under such weight, so that the contained air or elastic fluid may equalize the pressure by flowing to the places where the compression of the gasket is least. By selecting from tubing of different weights the said adaptation of the gasket to the weight of the cover may be secured.

Having thus described my invention, I claim—

1. The within-described sensitive annular gasket of soft elastic tubing, having hermetically sealed therein more or less air or other elastic fluid, in combination with a vessel and a loose cover of heavy material, one of which is constructed with a circumferential seat for the gasket, which is sprung into place on said part, while the other part is constructed with an opposing circumferential bearing-surface, whereby an air-tight, or nearly air-tight, joint is formed beneath the cover by its own weight, and the packing-gasket is attached by its own elasticity, as herein set forth 2. The combination of a sensitive annular gasket of soft elastic tubing, a loose cover of heavy material, having a circumferential seat in its edge, into which said gasket is sprung, and a vessel having a flaring upper edge, forming a bearing-surface, upon which said gasket makes an air-tight joint under the weight of the cover, as herein specified.

GEORGE B. THOMPSON.

Witnesses:
G. S. FERRIS,
H. MAX DANEAU.